US010244419B2

(12) United States Patent
Yilmaz et al.

(10) Patent No.: US 10,244,419 B2
(45) Date of Patent: Mar. 26, 2019

(54) TWO-LEVEL MOBILITY REFERENCE SIGNAL CONFIGURATION

(71) Applicant: Telefonaktiebolaget LM Ericsson (publ), Stockholm (SE)

(72) Inventors: Osman Nuri Can Yilmaz, Espoo (FI); Rasmus Axén, Linköping (SE); Rui Fan, Beijing (CN); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 15/522,111

(22) PCT Filed: Aug. 12, 2016

(86) PCT No.: PCT/CN2016/094805
§ 371 (c)(1),
(2) Date: Apr. 26, 2017

(87) PCT Pub. No.: WO2018/027886
PCT Pub. Date: Feb. 15, 2018

(65) Prior Publication Data
US 2018/0288642 A1 Oct. 4, 2018

(51) Int. Cl.
| | | |
|---|---|---|
| H04L 12/28 | (2006.01) | |
| H04W 24/10 | (2009.01) | |
| H04W 76/27 | (2018.01) | |
| H04L 5/00 | (2006.01) | |
| H04W 36/00 | (2009.01) | |
| H04J 1/16 | (2006.01) | |

(52) U.S. Cl.
CPC .......... H04W 24/10 (2013.01); H04L 5/0048 (2013.01); H04L 5/0091 (2013.01); H04W 36/00 (2013.01);
(Continued)

(58) Field of Classification Search
USPC ................................ 370/252, 329, 430, 386
See application file for complete search history.

(56) References Cited

U.S. PATENT DOCUMENTS

| | | | | |
|---|---|---|---|---|
| 2013/0028204 A1* | 1/2013 | Dinan | ................. | H04W 72/042 370/329 |
| 2015/0189574 A1* | 7/2015 | Ng | ........................ | H04W 24/08 370/252 |

(Continued)

FOREIGN PATENT DOCUMENTS

| | | |
|---|---|---|
| CN | 101541029 A | 9/2009 |
| CN | 101827444 A | 9/2010 |

(Continued)

OTHER PUBLICATIONS

Unknown, Author, "New SID Proposal: Study on New Radio Access Technology", 3GPP TSG RAN Meeting #71, RP-160671, Goteborg, NTT DOCOMO, Mar. 7-10, 2016, 1-8.

(Continued)

*Primary Examiner* — John Pezzlo
(74) *Attorney, Agent, or Firm* — Murphy, Bilak & Homiller, PLLC

(57) ABSTRACT

According to an aspect, one or more network nodes of a wireless communication system sends, to a wireless device operating in the wireless communication system, MRS configuration information, the MRS configuration information specifying one or more parameters for each of a plurality of MRS configurations. The network node subsequently sends, to the wireless device, an activation command indicating that at least a first one of the MRS configurations is to be used by the wireless device, the activation command including an index identifying the first one of the MRS configurations from among the plurality of MRS configurations. The wireless device receives the MRS configuration information and the activation command. The wireless device searches for at least one MRS specified by the first one of the MRS, responsive to the activation (Continued)

command and performs at least one measurement on the at least one MRS.

36 Claims, 10 Drawing Sheets

(52) U.S. Cl.
CPC ....... *H04W 36/0094* (2013.01); *H04W 76/27* (2018.02)

(56) References Cited

U.S. PATENT DOCUMENTS

2016/0262065 A1* 9/2016 Axmon ................ H04W 4/029
2017/0331670 A1* 11/2017 Parkvall .............. H04J 11/0079

FOREIGN PATENT DOCUMENTS

| CN | 103096346 A | 5/2013 |
| WO | 2014077742 A1 | 5/2014 |

OTHER PUBLICATIONS

3GPP, "3rd Generation Partnership Project; Technical Specification Group Radio Access Network; Study on Scenarios and Requirements for Next Generation Access Technologies; (Release 14)", 3GPP TR 38.913 V0.3.0, Mar. 2016, 1-30.

3GPP, "3rd Generation Partnership Project; Technical Specification Group Services and System Aspects; Study on Architecture for Next Generation System (Release 14)", 3GPP TR 23.799 V0.7.0, Aug. 2016, 1-323.

* cited by examiner

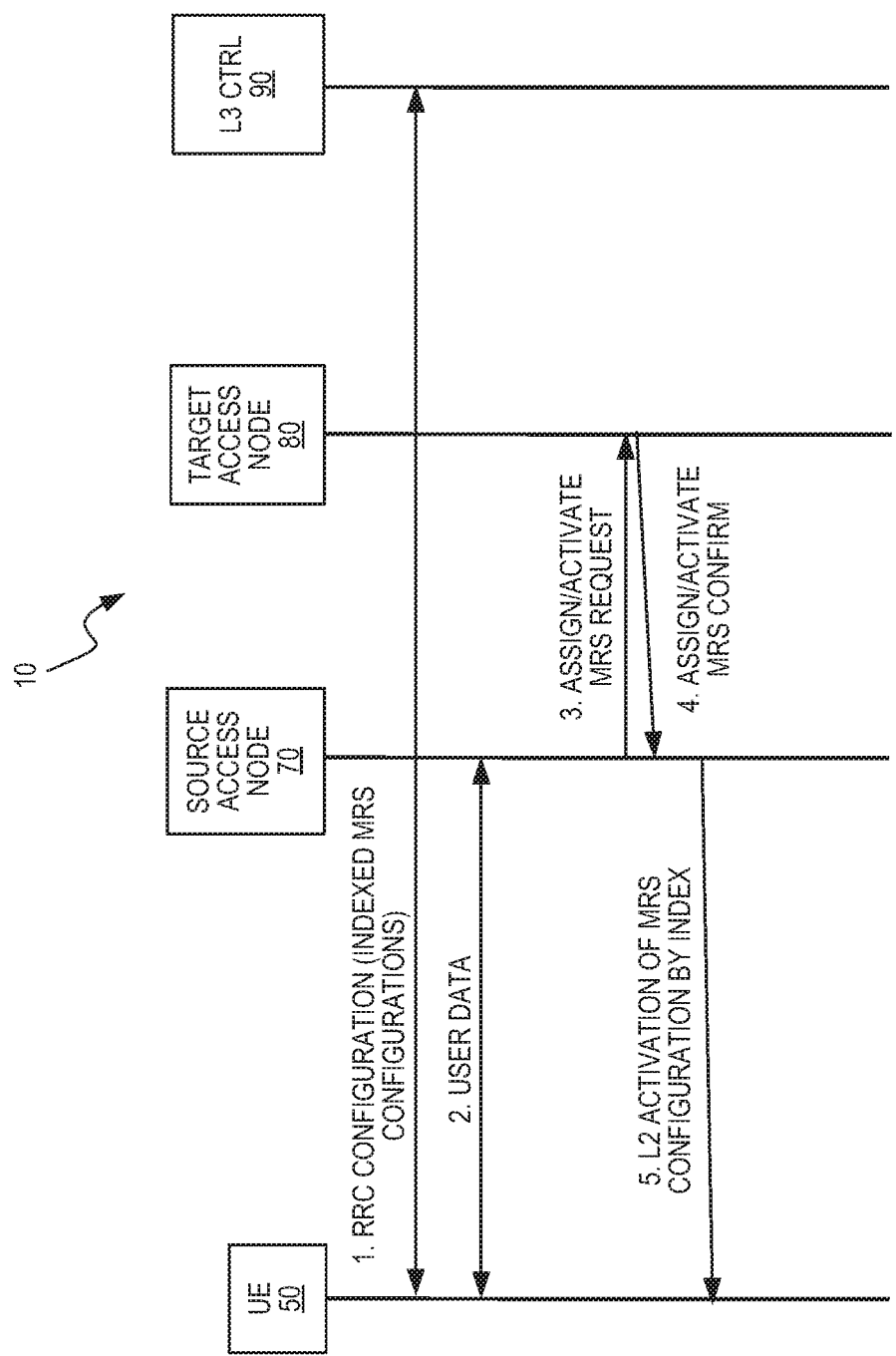

TWO-LEVEL MOBILITY REFERENCE SIGNAL CONFIGURATION

TECHNICAL FIELD

The present invention generally relates to a method in one or more network nodes of a wireless communication system, a method in a wireless device operating in a wireless communication system, an arrangement of one or more network nodes of a wireless communication system and a wireless device of a wireless communication system and particularly relates to efficiently handling the configuration of mobility reference signals or measurement reference signals.

BACKGROUND

Overall requirements for the Next Generation (NG) architecture (see TR 23.799, Study on Architecture for Next Generation) and, more specifically the NG Access Technology (see TR 38.913, Study on Scenarios and Requirements for Next Generation Access Technologies) will impact the design of the Active Mode Mobility solutions for the new RAT (NR) (see RP-160671, New SID Proposal: Study on New Radio Access Technology, DoCoMo) compared to the current mobility solution in Long Term Evolution (LTE). Some of these requirements include the need to support network energy efficiency mechanisms, the need to account for future developments, and the need to support a very wide range of frequencies (up to 100 GHz).

In the context of Neighbor-cell Relation (NR) handover, a measurement framework can be used to support dynamic network-triggered Mobility Reference Signal (MRS) measurement and reporting, and/or periodic MRS measurement and event based reporting (as in LTE). MRS may also stand for a Measurement Reference Signal. FIG. 1 shows a source access node 70, a target access node 80 and a user equipment (UE) 50 in the context of downlink measurement based handover. Under normal circumstances, user data and an MRS configuration may be exchanged between the UE 50 and the source access node 70. The MRS configuration messaging in the example of FIG. 1 is performed at the RRC level, or at Level 3 (L3). Upon a beam switch trigger, MRS measurements are made by the UE 50. Optionally, an MRS configuration and an activate measurement command are sent to from the source access node 70 to the UE 50. After measurements of downlink reference signals are reported by the UE 50 to the source access node 70, a handover decision is made by the source access node 70. A handover command can then be sent as a Radio Resource Control (RRC) connection reconfiguration message from the source access node 70. A handover command can also be implicitly indicated by an uplink grant message from the target access node 80.

Upon the reception of an RRC reconfiguration message or the best beam detection, the UE 50 contacts the target access node 80 using an Uplink Synchronization Signal (USS), which may be coupled with the MRS sequence of the target beam/cell/node, so that the selected USS can be used to indicate the detected best beam. The USS also serves as an uplink timing reference since the UE 50 needs uplink time synchronization when changing access nodes. USS has a similar design as Physical Random Access Channel (PRACH) preamble in LTE and is intended for the uplink timing advance (TA) calculation, uplink frequency offset estimation and uplink beam identification. As a response or a subsequent message to the USS, the target access node 80 sends an uplink grant, including the TA to establish uplink synchronization with the target access node 80.

As an alternative to the downlink measurement based handover, there could be uplink measurement based handover relying on the same principles, as shown in FIG. 2. This may involve the source access node 70 optionally sending a USS configuration and a USS activation command to the UE 50. The USS is used to indicate a detected test beam and to serve as an uplink timing reference. The source access node 70 and/or the target access node 80 perform measurements on signals and then determine the best beam. Yet, in this case, the beam switch command is an MRS, transmitted on a time/frequency resource indicated in the USS configuration message.

However, it is recognized herein that the current use of MRS configuration in these instances is not optimal, because the UE 50 may not need to measure/report all the configured MRSs all of the time. Also, the UE 50 may not have a sufficient time budget to be reconfigured at the RRC level for every MRS modification or configuration.

SUMMARY

Embodiments of the present invention relate to NC networks, including the fifth generation of cellular networks (5G). In particular the embodiments relate to how to efficiently handle the configuration of MRSs. The embodiments provide for a more efficient MRS configuration procedure and signaling by means of a two-level MRS configuration. The two-level MRS configuration includes one or more network nodes sending MRS configuration information for multiple MRS configurations to a wireless device and then subsequently sending an activation command indicating one of the MRS configurations. Advantageously, the MRS configuration information specifies parameters for each of a plurality of MRS configurations. The activation command indicates that at least a first one of the MRS configurations is to be used by the wireless device by including an index identifying the first MRS configuration from among the MRS configurations.

According to some embodiments, a method in one or more network nodes of a wireless communication system comprises sending, to a wireless device operating in the wireless communication system, MRS configuration information. The MRS configuration information specifies one or more parameters for each of a plurality of MRS configurations. The method then includes subsequently sending, to the wireless device, an activation command indicating that at least a first one of the MRS configurations is to be used by the wireless device. The activation command includes an index identifying the first one of the MRS configurations from among the plurality of MRS configurations.

According to some embodiments, a method in a wireless device operating in a wireless communication system includes receiving, from a network node in the wireless communication system, MRS configuration information. The MRS configuration information specifies one or more parameters for each of a plurality of MRS configurations. The method includes subsequently receiving, from a network node in the wireless communication system, an activation command indicating that at least a first one of the MRS configurations is to be used by the wireless device. The activation command includes an index identifying the first one of the MRS configurations from among the plurality of MRS configurations. The method also includes searching for at least one MRS specified by the first one of the MRS configurations, responsive to the activation command, and performing at least one measurement on the at least one MRS.

According to some embodiments, one or more network nodes of an arrangement in a wireless communication system each include a transceiver circuit configured to communicate with a wireless device and a processing circuit operatively associated with the transceiver circuit. One or more processing circuits of the one or more network nodes are configured to send, to a wireless device operating in the wireless communication system, MRS configuration information. The MRS configuration information specifying one or more parameters for each of a plurality of MRS configurations. The one or more processing circuits are also configured to subsequently send, to the wireless device, an activation command indicating that at least a first one of the MRS configurations is to be used by the wireless device. The activation command includes an index identifying the first one of the MRS configurations from among the plurality of MRS configurations.

According to some embodiments, a wireless device in a wireless communication system includes a transceiver circuit configured to communicate with a network node and a processing circuit operatively associated with the transceiver circuit. The processing circuit is configured to receive, from the network node in the wireless communication system, MRS configuration information. The MRS configuration information specifying one or more parameters for each of a plurality of MRS configurations. The processing circuit is configured to subsequently receive, from a network node in the wireless communication system, an activation command indicating that at least a first one of the MRS configurations is to be used by the wireless device. The activation command includes an index identifying the first one of the MRS configurations from among the plurality of MRS configurations. The processing circuit is configured to search for at least one MRS specified by the first one of the MRS configurations, responsive to the activation command, and performing at least one measurement on the at least one MRS.

Further aspects of the present invention are directed to an apparatus, computer program products or computer readable storage medium corresponding to the methods summarized above and functional implementations of the above-summarized network nodes and wireless device. Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 7A-7B illustrate an example embodiment for two-level MRS configuration.

DETAILED DESCRIPTION

Figure 1:
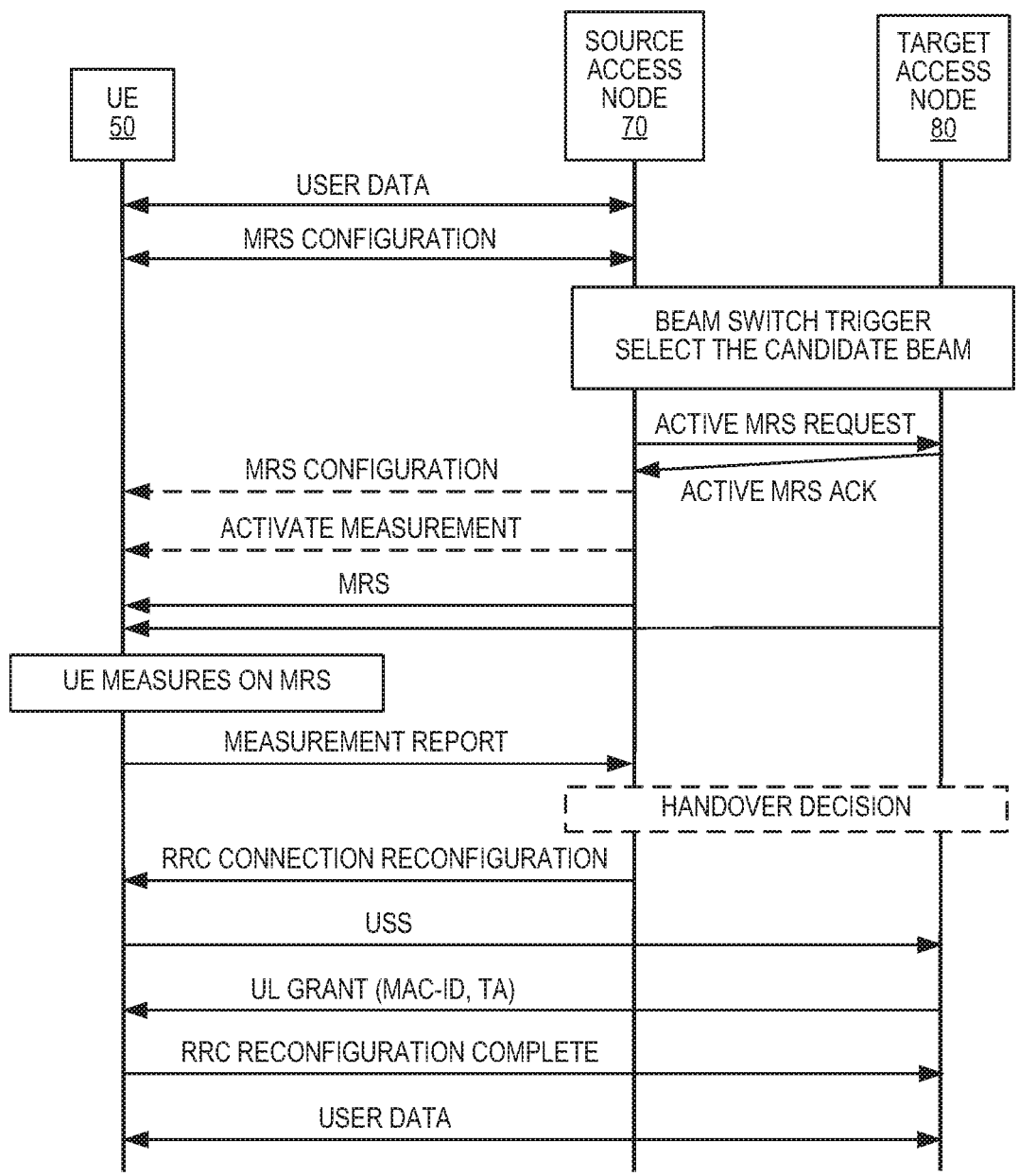
FIG. 1 illustrates downlink measurement based handover.
Figure 2:
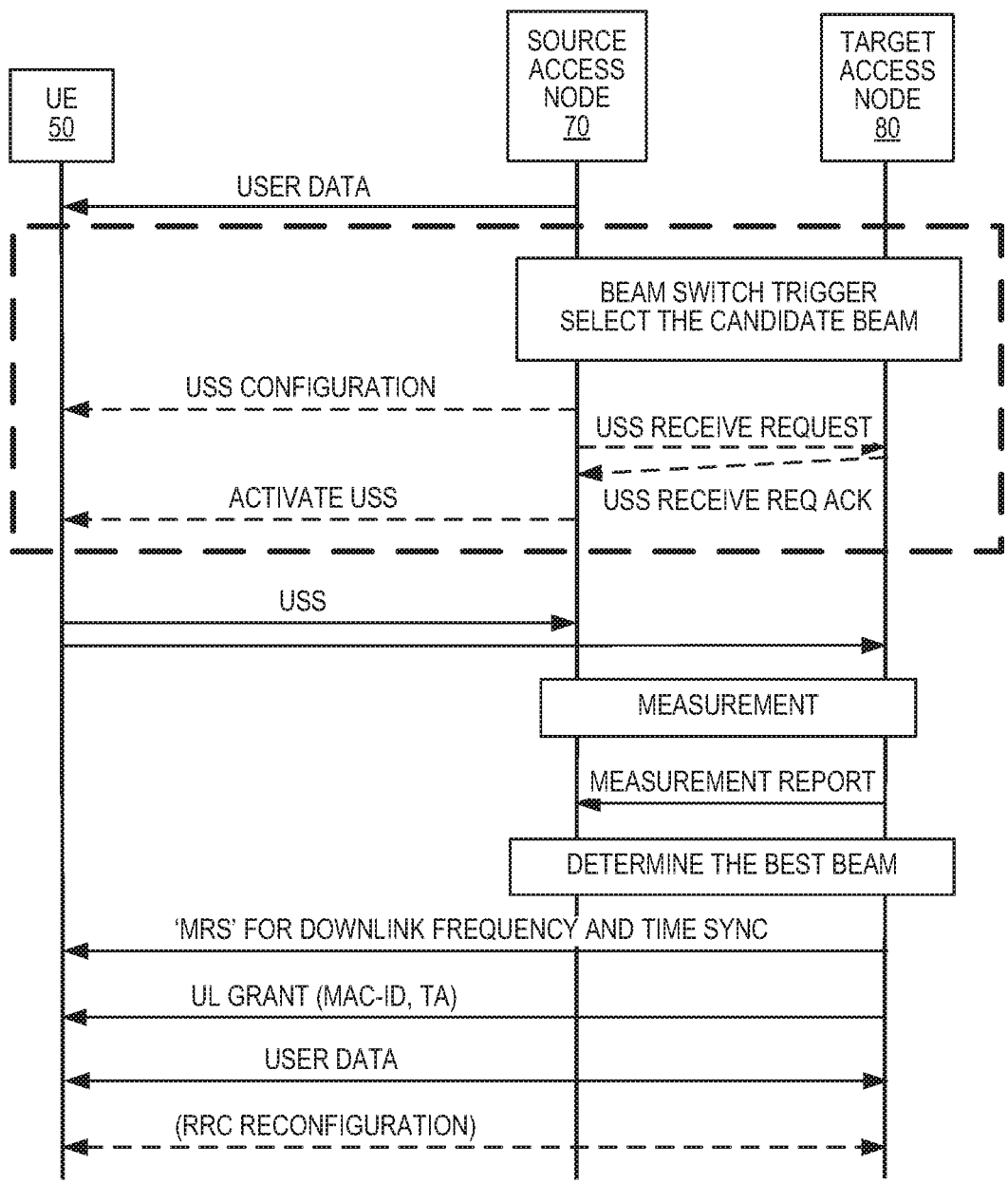
FIG. 2 illustrates uplink measurement based handover.

Embodiments of the present invention provide a more efficient signaling procedure for handling MRS configuration and activation using two-level signaling. The two-level MRS configuration includes (1) slow (L3) configuration, where RRC protocol is used to configure the UE with a set of MRSs, and (2) fast (L2) configuration, where Medium. Access Control (MAC) protocol is used to activate or deactivate a specific element of the RRC-configured MRS set for a UE, by the use of indexing instead of the use of actual MRS information. The network decision may be based on a vendor implementation specific algorithm. For example, the network may avoid unnecessary MRS measurement or measurement reporting in order to save energy or minimize signaling.

The terms "mobility reference signal", "measurement reference signal" and "MRS," as used herein, refer to signals that are transmitted in a wireless network and that are specifically designated for measurements by wireless devices, where the measurements are for use in mobility procedures, e.g., handovers from one node to another or from one beam to another. The MRS could be similar in design and/or purpose as a cell specific synchronization signal, such as a Primary Synchronization Signal (PSS) and a Secondary Synchronization Signal (SSS) used in LTE. The term "MRS configuration" refers to a set of parameters that defines the physical resources occupied by a transmitted MRS, i.e., the time-frequency and/or code resources, and/or that defines a signal sequence, such as a sequence of symbol values that make up the MRS. Thus, for example, different MRS configurations may specify different time-frequency resources for different MRSs, such as different patterns of resource elements in an Orthogonal Frequency-Division Multiplexing (OFDM) time-frequency grid. Different MRS configurations may instead or additionally specify different sequences of symbol values, for example. In some cases, MRS configurations may indicate search spaces, measurement gaps and/or measurement periodicities.

The techniques described herein allow the MRS configuration to be access-node-agonistic. In other words, the UE need not know to which access nodes these configured MRS signals are physically mapped. Therefore, this allows MRSs to be modified in a transparent way to the UE and without transmitting an L3 message to the UE. This is especially beneficial when the UE may not have a sufficient time budget to be reconfigured in the RRC level for an MRS modification or a configuration of a new MRS. The embodiments described herein enable the UE to only measure MRSs when needed and then only on those that are interesting given that specific UE position (i.e., a UE need not measure on all configured MRSs). The techniques use less signaling overhead for mobility and provide a faster procedure, thus addressing availability and seamless mobility requirements of 5G. The embodiments also support a split architecture where the delay between baseband processing functions (BPFs) is very short, but the delay between BPF and Radio Control Function (RCF) can be significantly higher since it can be placed far away from the BPFs.

Figure 3:
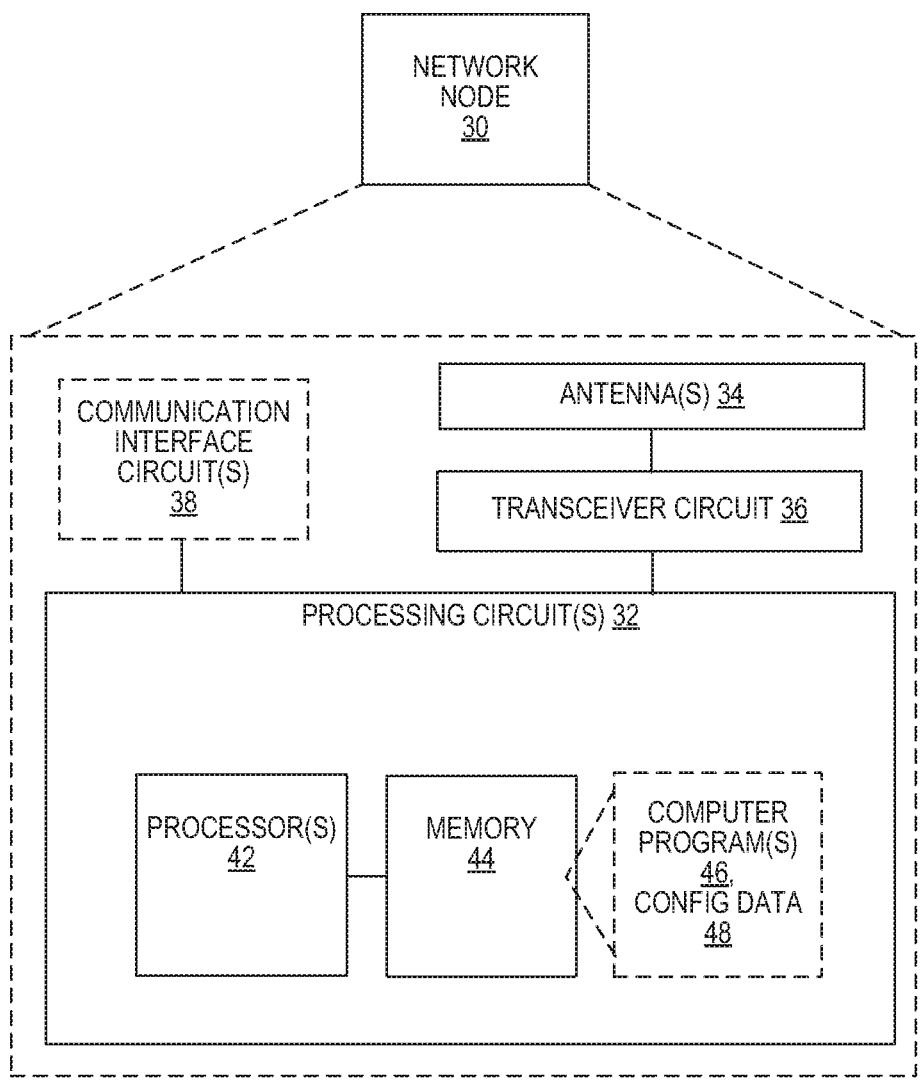
FIG. 3 is a block diagram illustrating a network node, according to some embodiments of the present invention.

FIG. 3 illustrates a diagram of a network node 30 that can represent each network node of one or more network nodes of an arrangement in a wireless communication system. The network node 30 may be, for example, a network access node such as a base station or eNodeB. The network node 30 provides an air interface to a wireless device, e.g., an LTE air interface or WLAN air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication, or WLAN services if necessary. According to various embodiments, cellular communication services may be operated according to any one or more of the 3GPP cellular standards, GSM, GPRS, WCDMA, HSDPA, LTE and LTE-Advanced. The network node 30 may also include communication interface circuits 38 for communicating with nodes in the core network, other peer radio nodes, and/or other types of nodes in the network.

The network node 30 also includes one or more processing circuits 32 that are operatively associated with and configured to control the communication interface circuit(s) 38 and/or the transceiver circuit 36. The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any combination thereof. More generally, the processing circuit 32 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the node 30. Here, "non-transitory" means permanent, semi-permanent, or at least temporarily persistent storage and encompasses both long-term storage in non-volatile memory and storage in working memory, e.g., for program execution.

In some embodiments, each of one or more network nodes of an arrangement in a wireless communication system is configured to function as the network node 30. Accordingly, in some embodiments, one or more processing circuits 32 of the one or more network nodes 30 are configured to send, to a wireless device 50 operating in the wireless communication system, MRS configuration information, where the MRS configuration information specifies one or more parameters for each of a plurality of MRS configurations. The one or more processing circuits of the one or more network nodes 30 are configured to subsequently send, to the wireless device 50, an activation command indicating that at least a first one of the MRS configurations is to be used by the wireless device 50, where the activation command includes an index identifying the first one of the MRS configurations from among the plurality of MRS configurations. That is, in some cases, one network node may send the MRS configuration information and a different network node may send the activation command.

Regardless of its specific implementation details, the one or more processing circuits 32 of the one or more network nodes 30 are configured to perform a method according to one or more of the techniques described above, such as method 400 of FIG. 4. The method 400 includes sending, to a wireless device 50 operating in the wireless communication system, MRS configuration information, the MRS configuration information specifying one or more parameters for each of a plurality of MRS configurations (block 402). The method 400 also includes subsequently sending, to the wireless device 50, an activation command indicating that at least a first one of the MRS configurations is to be used by the wireless device, the activation command including an index identifying the first one of the MRS configurations from among the plurality of MRS configurations (block 404).

In some embodiments, the sending 402 of the MRS configuration information is performed using a Radio Resource Configuration (RRC) protocol and the sending 404 of the activation command is performed using a medium access control (MAC) protocol.

The method 400 may include sending, to the wireless device 50, a deactivation command indicating that the wireless device 50 is to stop using a second one of the MRS configurations, the deactivation including an index identifying the second one of the MRS configurations from among the plurality of MRS configurations. The method 400 may also include receiving from the wireless device 50, at one of the one or more network nodes 30, a measurement report comprising measurement data for a MRS specified by the first one of the MRS configurations.

The first one of the MRS configurations may specify a plurality of MRSs to be measured by the wireless device 50, each MRS corresponding to a MRS identifier. Each MRS identifier may correspond to a predetermined MRS sequence.

In some embodiments, the first one of the MRS configurations specifies a search space identifier, the search space identifier indicating one of a plurality of transmission resource regions to be used by the wireless device 50 when performing measurements of a MRS specified by the first one of the MRS configurations. The first one of the MRS configurations may specify measurement gaps and/or measurement periodicity.

The sending of the MRS configuration information may be performed by a different network node than the network node that sends the activation command. For example, the source access node 70 may send the MRS configuration information to the UE 50, but it is the target access node 80 that sends the indexed activation or deactivation command to the UE 50.

Figure 5:
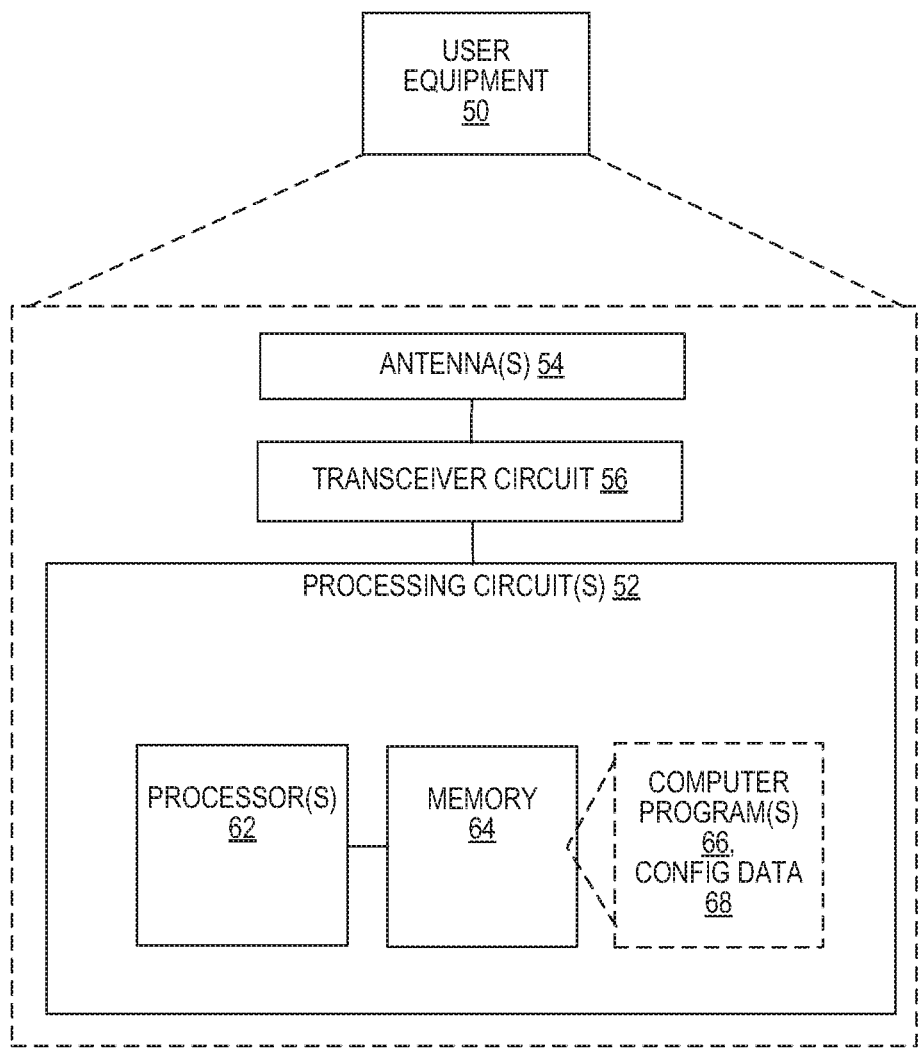
FIG. 5 is a block diagram illustrating a wireless device, according to some embodiments.

FIG. 5 illustrates an example wireless device 50, referred to as UE 50 in FIG. 5, that is configured to perform the techniques described herein. The UE 50 may also be considered to represent any wireless devices that may operate in a network. The UE 50 herein can be any type of wireless device capable of communicating with network node or another UE over radio signals. The UE 50 may also be referred to, in various contexts, as a radio communication device, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The UE 50 communicates with one or more radio nodes or base stations, such as one or more network nodes 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The UE 50 also includes one or more processing circuits 52 that are operatively associated with and control the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

Accordingly, in some embodiments, the processing circuit 52 of the UE 50 is configured to receive, from a network node 30 in the wireless communication system, MRS configuration information, the MRS configuration information specifying one or more parameters for each of a plurality of MRS configurations. The processing circuit 52 is also configured to subsequently receive, from a network node in the wireless communication system, an activation command indicating that at least a first one of the MRS configurations is to be used by the UE 50, the activation command including an index identifying the first one of the MRS configurations from among the plurality of MRS configurations. The activation command may be received from a different network node than the network node 30 that sent the MRS configuration information. The processing circuit 52 is also configured to search for at least one MRS specified by the first one of the MRS configurations, responsive to the activation command and perform at least one measurement on the at least one MRS.

Figure 6:
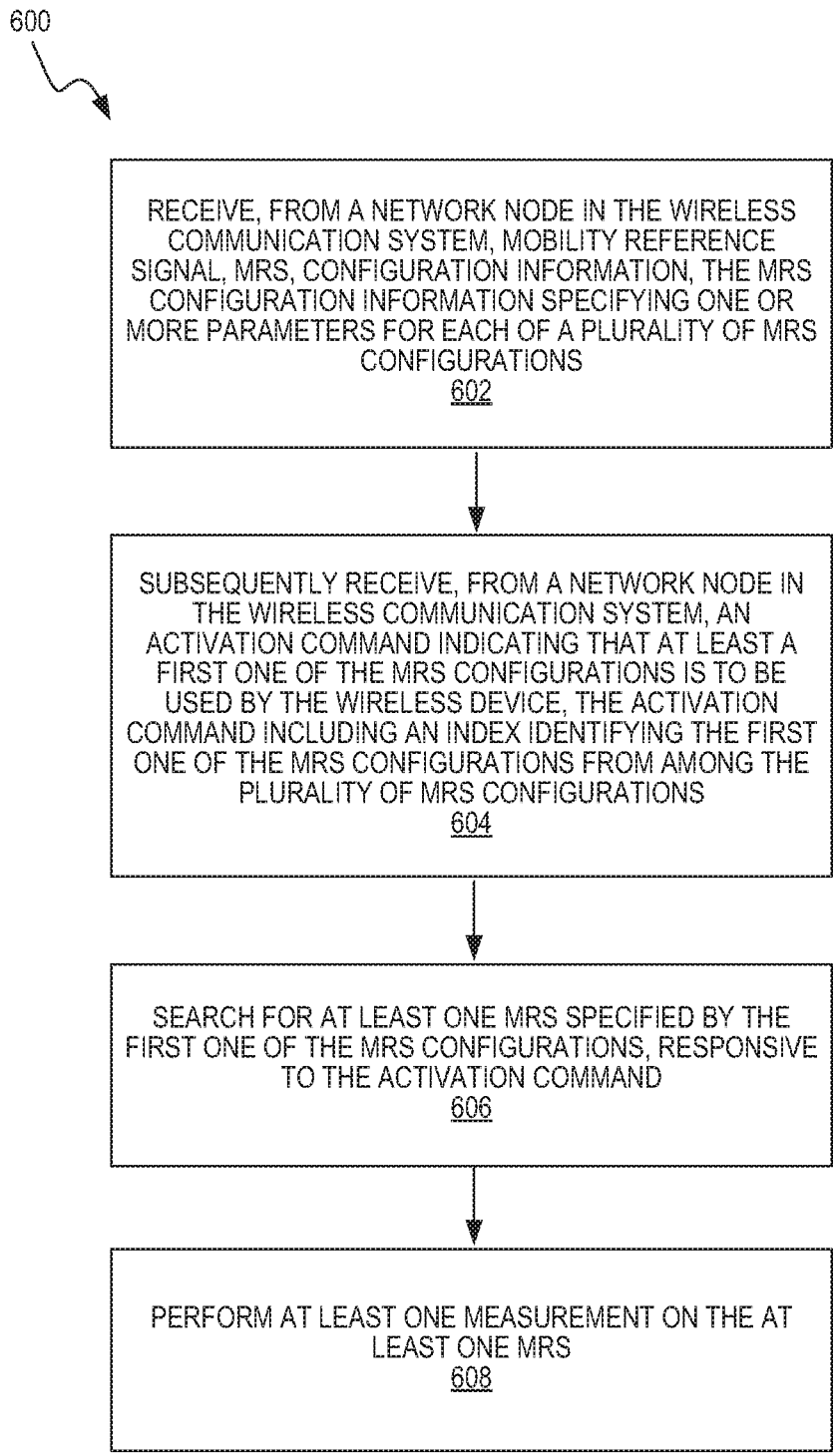
FIG. 6 is a process flow diagram showing another example method, according to some embodiments.

Regardless of its specific implementation details, the processing circuit 52 of the UE 50 is configured to perform a method according to one or more of the techniques described, such as method 600 of FIG. 6. The method 600 includes receiving, from a network node 30 in the wireless communication system, MRS configuration information, the MRS configuration information specifying one or more parameters for each of a plurality of MRS configurations (block 602). The method 600 includes subsequently receiving, from a network node in the wireless communication system, an activation command indicating that at least a first one of the MRS configurations is to be used by the UE 50, the activation command including an index identifying the first one of the MRS configurations from among the plurality of MRS configurations (block 604). The method 600 also includes searching for at least one MRS specified by the first one of the MRS configurations, responsive to the activation command (block 606) and performing at least one measurement on the at least one MRS (block 608).

In some embodiments, the receiving of the MRS configuration information is performed using an RRC protocol, and the receiving of the activation command is performed using a MAC protocol.

The method 600 may further include receiving a deactivation command indicating that the UE 50 is to stop using a second one of the MRS configurations, the deactivation including an index identifying the second one of the MRS configurations from among the plurality of MRS configurations and discontinuing measurements of at least one MRS specified by the second one of the MRS configurations. The method 600 may include sending a measurement report including measurement data for a MRS specified by the first one of the MRS configurations.

In some embodiments, the first one of the MRS configurations specifies a plurality of MRSs to be measured by the UE 50, each MRS corresponding to a MRS identifier. The first one of the MRS configurations may specify a search space identifier. The search space identifier indicates one of a plurality of transmission resource regions to be used by the UE 50 when performing measurements of a MRS specified by the first one of the MRS configurations. The searching for at least one MRS specified by the first one of the MRS is performed using the indicated transmission resource region. The first one of the MRS configurations may specify measurement gaps and/or measurement periodicity.

Figure 7B:
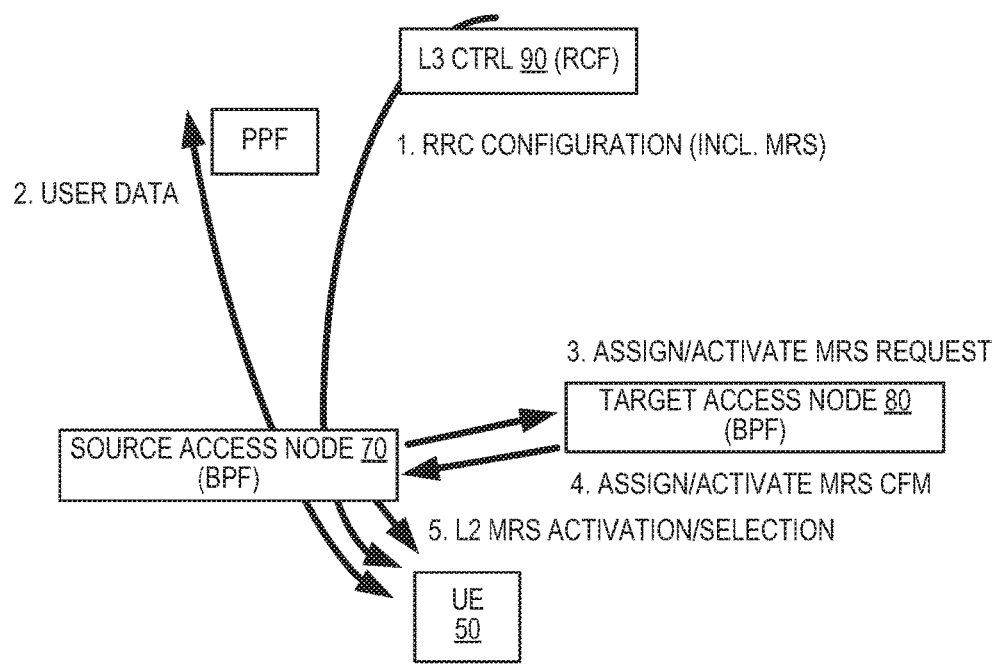

FIGS. 7A and 7B shown an example embodiment of an arrangement 10 for two-level MRS configuration in a wireless communication system. In this example, the source access node 70 and/or the target access node 80 are configured to perform MRS configuration and activation using two layers, L3 and L2, as described for the one or more network nodes 30 of the arrangement 10. The L3 Control 90, which may be located in the centralized part of the RAN (e.g., remote control unit/radio control function (RCU/RCF) in the 5G context), has the configuration and planning responsibility of MRSs. As shown by step 1 in both FIGS. 7A and 7B, the L3 Control 90 configures the UE 50 with a set of MRS configurations and conveys the MRS configurations by means of L3 signaling (e.g., using the RRC protocol). At step 2 or otherwise, user data is exchanged between the UE 50 and the source access node 70, with a baseband processing function in the source access node 70 forwarding user data to and receiving user data from a packet processing function (PPF).

The source and target access nodes 70, 80 request and confirm MRS assignment and activation at steps 3 and 4. This part of the procedure is transparent to the UE.

At step 5, L2 signaling (MAC protocol) is used to activate or deactivate a specific MRS configuration of the RRC-configured MRS set for the UE 50 by indicating the index of the respective MRS, instead of calling with the complete MRS configuration information. The activation (and deactivation) of a particular MRS configuration or set of MRS configurations may be handled at Layer 2 (L2), i.e., the MAC layer, which, in an access node having a distributed architecture, may be implemented in a distributed node close to the access node's antenna(s), e.g., in the access node's baseband processing unit/baseband processing function (BPU/BPF), in the 5G context. This allows for a faster control of MRS activation and deactivation, relative to the relatively slow RRC-based configuration procedures. This is not only quicker, but saves control information bits.

Since the BPU will be able to handle mobility locally, the possibility of sending a set of MRS configurations to the UE in advance, and then selectively telling the UE 50 which MRS to search for is advantageous. With this introduced flexibility at the BPU, MRSs can be configured in a smart way when performing mobility, such as deciding how and when to reuse the MRSs. For example, one or more network nodes 30 may activate any of the UE-configured MRSs and tell the UE 50 to search for it without involving RRC and the roundtrip delays it would cause.

By using faster L2 signaling with MRS indexes for activation or deactivation, the UE 50 also saves energy by not searching for all configured MRSs continuously. Yet, the option to either constantly search by UE or only search when activated may be a configuration option in the RRC message as well as a part of the slower (L3) MRS configuration.

According to the techniques described herein, the source access node 70 can proactively configure the UE 50 for a set of MRSs by means of an L3 MRS configuration message. The actual assignment and activation of MRSs can later be negotiated between the source access node 70 and the target access node 80 in a way transparent to the UE 50. Since the particular MRS to be used by the UE 50 can simply be indexed by the L2 activation message, instead of re-involving the L3 configuration, the UE 50 can measure and get synched with the target access node 80 faster. The RRC signaled list of MRS configurations could be, for instance, illustrated by Table 1.

TABLE 1

| Index | List of MRS IDs | Search space ID |
|-------|-----------------|-----------------|
| 1     | 1, 2, 3, 4      | 1               |
| 2     | 3, 4            | 2               |
| 3     | 1, 2            | 2               |
| ...   |                 |                 |

In some embodiments, there may be a set of standardized MRS sequences that are identified in the list by an MRS ID. Similarly, there may be a list of search spaces in the specifications, which are identified in the list by a search space ID. The measurement activation on the MAC level then includes an index value pointing to a certain row of a table that has been configured in the UE 50, e.g., the table shown in Table 1. The table can be fairly long, so as to include a wide variety of combinations of MRS signals and, optionally, search spaces, but since it can be signaled to the UE 50 long before the handover, it can be signaled at a point where the UE 50 is in the middle of a beam and the signal is strong, so that the relative signaling cost becomes small.

Figure 4:
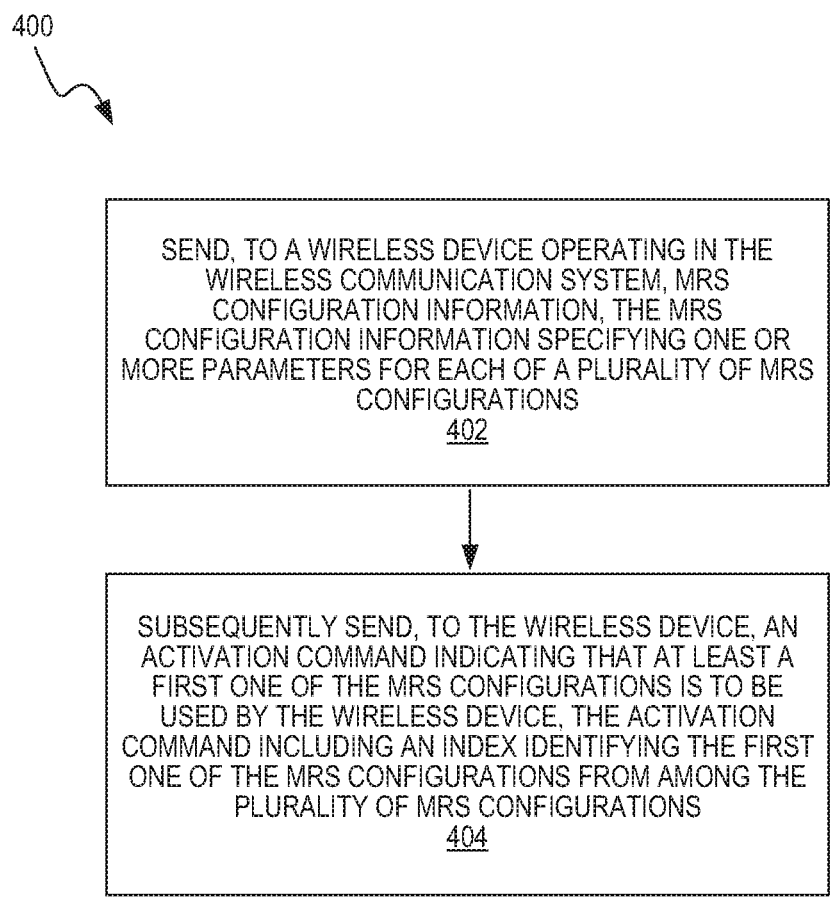
FIG. 4 is a process flow diagram showing an example method, according to some embodiments.

As discussed in detail above, the techniques described herein, e.g., as illustrated in the process flow diagrams of FIGS. 4 and 6, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 8:
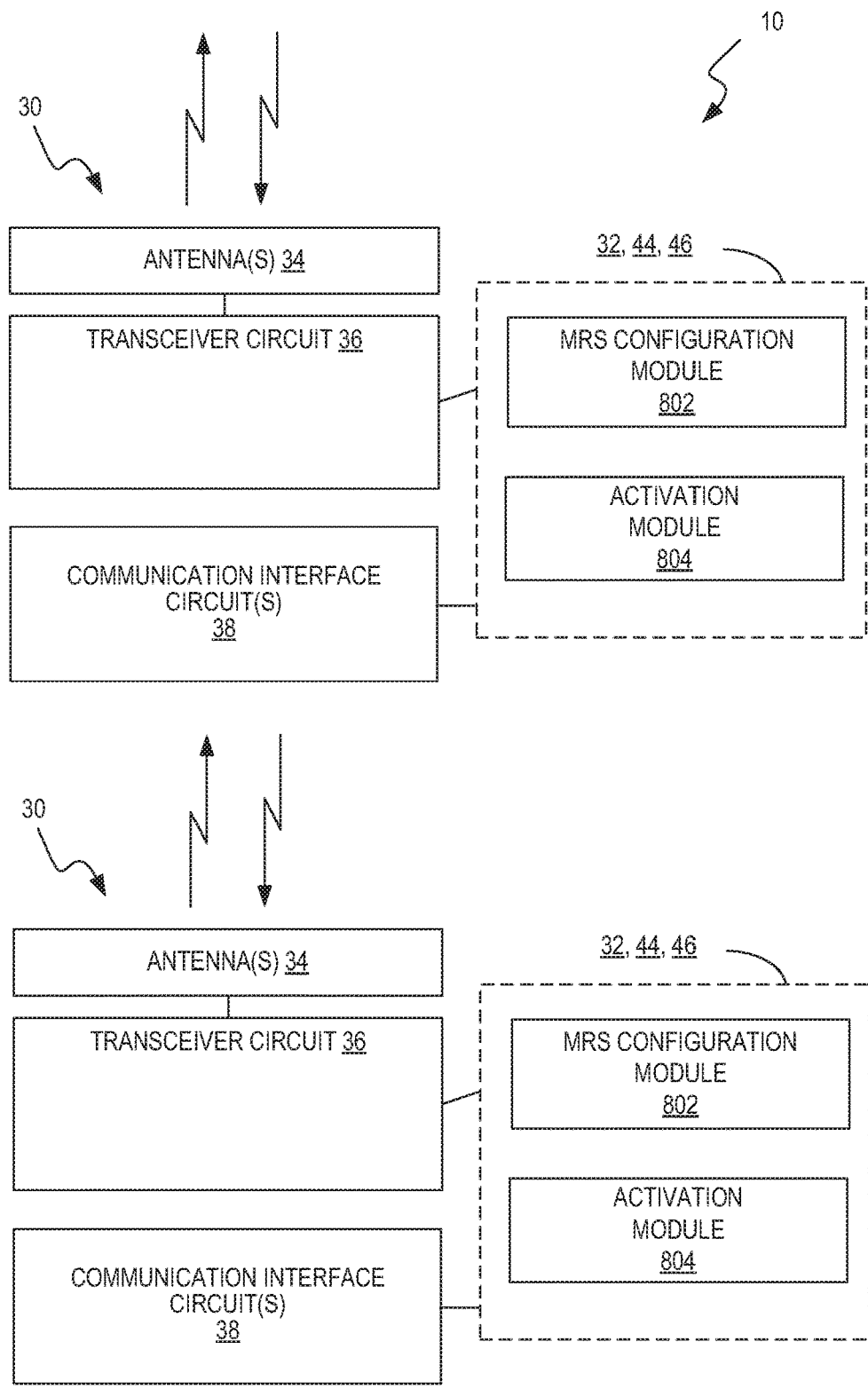
FIG. 8 is a block diagram of a functional implementation of an arrangement of one or more network nodes, according to some embodiments.

FIG. 8 illustrates an example functional module or circuit architecture as may be implemented in an arrangement 10 of one or more network nodes 30 of a wireless communication system. The implementation includes an MRS configuration module 802 for sending, to a wireless device operating in the wireless communication system, MRS configuration information, the MRS configuration information specifying one or more parameters for each of a plurality of MRS configurations. The implementation also includes an activation module 804 for subsequently sending, to the wireless device, an activation command indicating that at least a first one of the MRS configurations is to be used by the wireless device, the activation command including an index identifying the first one of the MRS configurations from among the plurality of MRS configurations. The activation module 804 may also be located in another network node.

Figure 9:
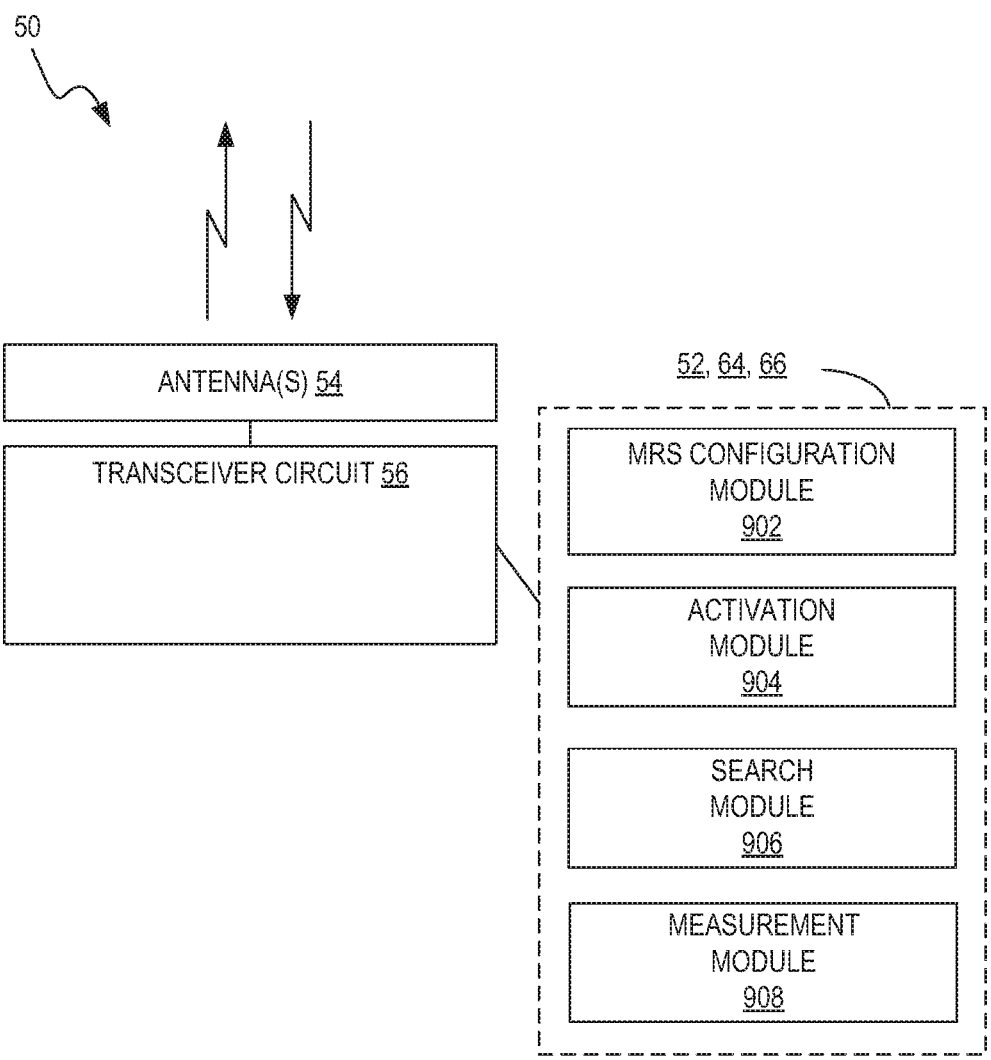
FIG. 9 is a block diagram of a functional implementation of a wireless device, according to some embodiments.

Similarly, FIG. 9 illustrates an example functional module or circuit architecture as may be implemented in a wireless device of a wireless communication system, such as UE 50. The implementation includes an MRS configuration module 902 for receiving, from a network node in the wireless communication system, MRS configuration information, the MRS configuration information specifying one or more parameters for each of a plurality of MRS configurations. The implementation also includes an activation module 904 for subsequently receiving, from a network node in the wireless communication system, an activation command indicating that at least a first one of the MRS configurations is to be used by the wireless device, the activation command including an index identifying the first one of the MRS configurations from among the plurality of MRS configurations. The implementation includes a search module 906 for searching for at least one MRS specified by the first one of the MRS configurations, responsive to the activation command and a measurement module 908 for performing at least one measurement on the at least one MRS.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic, and descriptive sense only and not for purposes of limitation.

What is claimed is:

1. A method, in one or more network nodes of a wireless communication system, the method comprising:
    sending, to a wireless device operating in the wireless communication system, mobility or measurement reference signal (MRS) configuration information, the MRS configuration information specifying one or more parameters for each of a plurality of MRS configurations; and
    subsequently sending, to the wireless device, an activation command indicating that at least a first one of the MRS configurations is to be used by the wireless device, the activation command including an index identifying the first one of the MRS configurations from among the plurality of MRS configurations.

2. The method of claim 1, wherein the sending of the MRS configuration information is performed using a Radio Resource Configuration (RRC) protocol and the sending of the activation command is performed using a medium access control (MAC) protocol.

3. The method of claim 1, wherein the sending of the MRS configuration information is performed by a different network node than the sending of the activation command.

4. The method of claim 1, further comprising sending, to the wireless device, a deactivation command indicating that the wireless device is to stop using a second one of the MRS configurations, the deactivation including an index identifying the second one of the MRS configurations from among the plurality of MRS configurations.

5. The method of claim 1, further comprising receiving from the wireless device, at one of the one or more network nodes, a measurement report comprising measurement data for a MRS specified by the first one of the MRS configurations.

6. The method of claim 1, wherein the first one of the MRS configurations specifies a plurality of MRS's to be measured by the wireless device, each MRS corresponding to a MRS identifier.

7. The method of claim 6, wherein each MRS identifier corresponds to a predetermined MRS sequence.

8. The method of claim 1, wherein the first one of the MRS configurations specifies a search space identifier, the search space identifier indicating one of a plurality of transmission resource regions to be used by the wireless device when performing measurements of a MRS specified by the first one of the MRS configurations.

9. The method of claim 1, wherein the first one of the MRS configurations specifies one or more of: measurement gaps; and measurement periodicity.

10. A method, in a wireless device operating in a wireless communication system, the method comprising:
receiving, from a network node in the wireless communication system, mobility or measurement reference signal (MRS) configuration information, the MRS configuration information specifying one or more parameters for each of a plurality of MRS configurations;
subsequently receiving, from a network node in the wireless communication system, an activation command indicating that at least a first one of the MRS configurations is to be used by the wireless device, the activation command including an index identifying the first one of the MRS configurations from among the plurality of MRS configurations;
searching for at least one MRS specified by the first one of the MRS configurations, responsive to the activation command; and
performing at least one measurement on the at least one MRS.

11. The method of claim 10, wherein the receiving of the MRS configuration information is performed using a Radio Resource Configuration (RRC) protocol and the receiving of the activation command is performed using a medium access control (MAC) protocol.

12. The method of claim 10, wherein the receiving of the MRS configuration information is from a different network node than the receiving of the activation command.

13. The method of claim 10, further comprising:
receiving a deactivation command indicating that the wireless device is to stop using a second one of the MRS configurations, the deactivation including an index identifying the second one of the MRS configurations from among the plurality of MRS configurations; and
discontinuing measurements of at least one MRS specified by the second one of the MRS configurations.

14. The method of claim 10, wherein the method further comprises sending a measurement report including measurement data for a MRS specified by the first one of the MRS configurations.

15. The method of claim 10, wherein the first one of the MRS configurations specifies a plurality of MRS's to be measured by the wireless device, each MRS corresponding to a MRS identifier.

16. The method of claim 10, wherein the first one of the MRS configurations specifies a search space identifier, the search space identifier indicating one of a plurality of transmission resource regions to be used by the wireless device when performing measurements of a MRS specified by the first one of the MRS configurations, and wherein the searching for the at least one MRS specified by the first one of the MRS configurations is performed using the indicated transmission resource region.

17. The method of claim 10, wherein the first one of the MRS configurations specifies one or more of: measurement gaps; and measurement periodicity.

18. An arrangement of one or more network nodes of a wireless communication system, wherein each of the one or more network nodes comprises:
a transceiver circuit configured to communicate with a wireless device operating in the wireless communication system; and
a processing circuit operatively associated with the transceiver circuit,
wherein one or more processing circuits of the one or more network nodes are configured to:
send, to the wireless device, mobility or measurement reference signal (MRS) configuration information, the MRS configuration information specifying one or more parameters for each of a plurality of MRS configurations; and
subsequently send, to the wireless device, an activation command indicating that at least a first one of the MRS configurations is to be used by the wireless device, the activation command including an index identifying the first one of the MRS configurations from among the plurality of MRS configurations.

19. The arrangement of claim 18, wherein the one or more processing circuits are configured to send the MRS configuration information using a Radio Resource Configuration (RRC) protocol and send the activation command using a medium access control (MAC) protocol.

20. The arrangement of claim 18, wherein one of the one or more processing circuits is configured to send the MRS configuration information and a different one of the one or more processing circuits is configured to send of the activation command.

21. The arrangement of claim 18, wherein the one or more processing circuits are configured to send, to the wireless device, a deactivation command indicating that the wireless device is to stop using a second one of the MRS configurations, the deactivation including an index identifying the second one of the MRS configurations from among the plurality of MRS configurations.

22. The arrangement of claim 18, wherein the one or more processing circuits are configured to receive from the wireless device a measurement report comprising measurement data for a MRS specified by the first one of the MRS configurations.

23. The arrangement of claim 18, wherein the first one of the MRS configurations specifies a plurality of MRS's to be measured by the wireless device, each MRS corresponding to a MRS identifier.

24. The arrangement of claim 23, wherein each MRS identifier corresponds to a predetermined MRS sequence.

25. The arrangement of claim 18, wherein the first one of the MRS configurations specifies a search space identifier, the search space identifier indicating one of a plurality of transmission resource regions to be used by the wireless device when performing measurements of a MRS specified by the first one of the MRS configurations.

26. The arrangement of claim 18, wherein the first one of the MRS configurations specifies one or more of: measurement gaps; and measurement periodicity.

27. A wireless device of a wireless communication system, comprising:
a transceiver circuit configured to communicate with one or more network nodes operating in the wireless communication system; and
a processing circuit operatively associated with the transceiver circuit and configured to:
receive, from a network node, mobility or measurement reference signal (MRS) configuration information, the MRS configuration information specifying one or more parameters for each of a plurality of MRS configurations;
subsequently receive, from a network node in the wireless communication system, an activation command indicating that at least a first one of the MRS configurations is to be used by the wireless device, the activation command including an index identifying the first one of the MRS configurations from among the plurality of MRS configurations;
search for at least one MRS specified by the first one of the MRS configurations, responsive to the activation command; and
perform at least one measurement on the at least one MRS.

28. The wireless device of claim 27, wherein the processing circuit is configured to receive the MRS configuration information using a Radio Resource Configuration (RRC) protocol and receive the activation command using a medium access control (MAC) protocol.

29. The wireless device of claim 27, wherein the processing circuit is configured to receive the MRS configuration information from a network node different than the network node from which it received the activation command.

30. The wireless device of claim 27, wherein the processing circuit is configured to:
receive a deactivation command indicating that the wireless device is to stop using a second one of the MRS configurations, the deactivation including an index identifying the second one of the MRS configurations from among the plurality of MRS configurations; and
discontinue measurements of at least one MRS specified by the second one of the MRS configurations.

31. The wireless device of claim 27, wherein the processing circuit is configured to:
send a measurement report including measurement data for a MRS specified by the first one of the MRS configurations.

32. The wireless device of claim 27, wherein the first one of the MRS configurations specifies a plurality of MRS's to be measured by the wireless device, each MRS corresponding to a MRS identifier.

33. The wireless device of claim 27, wherein the first one of the MRS configurations specifies a search space identifier, the search space identifier indicating one of a plurality of transmission resource regions to be used by the wireless device when performing measurements of a MRS specified by the first one of the MRS configurations, and wherein the processing circuit is configured to search for the at least one MRS specified by the first one of the MRS configurations by using the indicated transmission resource region.

34. The wireless device of claim 27, wherein the first one of the MRS configurations specifies one or more of: measurement gaps; and measurement periodicity.

35. A non-transitory computer readable storage medium storing a computer program comprising program instructions that, when executed on at least one processing circuit of one or more network nodes of an arrangement in wireless communication system, configures the one or more network nodes to:
send, to a wireless device in the wireless communication system, mobility or measurement reference signal (MRS) configuration information, the MRS configuration information specifying one or more parameters for each of a plurality of MRS configurations; and
subsequently send, to the wireless device, an activation command indicating that at least a first one of the MRS configurations is to be used by the wireless device, the activation command including an index identifying the first one of the MRS configurations from among the plurality of MRS configurations.

36. A non-transitory computer readable storage medium storing a computer program comprising program instructions that, when executed on at least one processing circuit of a wireless device in a wireless communication system, configures the wireless device to:
receive, from a network node operating in the wireless communication system, mobility or measurement reference signal (MRS) configuration information, the MRS configuration information specifying one or more parameters for each of a plurality of MRS configurations;
subsequently receive, from a network node in the wireless communication system, an activation command indicating that at least a first one of the MRS configurations is to be used by the wireless device, the activation command including an index identifying the first one of the MRS configurations from among the plurality of MRS configurations;
search for at least one MRS specified by the first one of the MRS configurations, responsive to the activation command; and
perform at least one measurement on the at least one MRS.

* * * * *

UNITED STATES PATENT AND TRADEMARK OFFICE
CERTIFICATE OF CORRECTION

PATENT NO. : 10,244,419 B2
APPLICATION NO. : 15/522111
DATED : March 26, 2019
INVENTOR(S) : Yilmaz et al.

Page 1 of 1

It is certified that error appears in the above-identified patent and that said Letters Patent is hereby corrected as shown below:

In the Specification

In Column 2, Line 25, delete "NC" and insert -- NG --, therefor.

In Column 2, Line 27, delete "particular" and insert -- particular, --, therefor.

In Column 4, Line 14, delete "Medium." and insert -- Medium --, therefor.

In Column 10, Line 45, delete "generic," and insert -- generic --, therefor.

Signed and Sealed this
Eighteenth Day of June, 2019

Andrei Iancu
*Director of the United States Patent and Trademark Office*